(12) United States Patent
Despesse

(10) Patent No.: US 7,942,251 B2
(45) Date of Patent: May 17, 2011

(54) SYSTEM LIMITING THE TRANSMISSION OF MECHANICAL VIBRATIONS BY FREQUENCY FILTERING

(75) Inventor: Ghislain Despesse, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 777 days.

(21) Appl. No.: 12/009,365

(22) Filed: Jan. 18, 2008

(65) Prior Publication Data

US 2008/0174059 A1    Jul. 24, 2008

(30) Foreign Application Priority Data

Jan. 22, 2007 (FR) ..................... 07 52801

(51) Int. Cl.
*F16F 7/10* (2006.01)
(52) U.S. Cl. ....................................... 188/378
(58) Field of Classification Search .......... 188/378–380; 267/273, 274
See application file for complete search history.

(56) References Cited

U.S. PATENT DOCUMENTS

| | | | |
|---|---|---|---|
| 5,301,111 A | 4/1994 | Utsui et al. | |
| 6,721,641 B1* | 4/2004 | Denne | ............................. 701/37 |
| 2007/0006632 A1* | 1/2007 | Iwashita et al. | ................. 72/351 |
| 2007/0007770 A1 | 1/2007 | Jager et al. | |

FOREIGN PATENT DOCUMENTS

| | | |
|---|---|---|
| EP | 60151111 | 8/1985 |
| EP | 0 202 880 A2 | 11/1986 |
| EP | 61290252 | 12/1986 |
| FR | 2586462 | 2/1987 |
| JP | 63-172037 | 7/1988 |
| WO | 2006106134 | 10/2006 |

* cited by examiner

*Primary Examiner* — Melanie Torres Williams
(74) *Attorney, Agent, or Firm* — Nixon Peabody LLP

(57) ABSTRACT

Linkage system between a first part and a second part capable of movement relative to each other, incorporating a link capable of transmitting forces between the first and second parts and a frequency control loop for said link incorporating means of measuring a distance separating the first and second parts, a frequency filter for said measurements in a given frequency band and means for comparing these filtered values with a set point, said control loop controlling the link such that it transmits forces only in the given frequency band, the frequency control loop being a position control loop, a speed control loop being incorporated in the position control loop, and a force control loop being incorporated in the speed control loop.

16 Claims, 6 Drawing Sheets

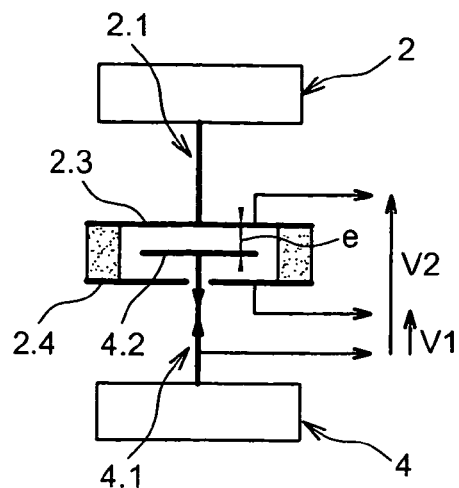
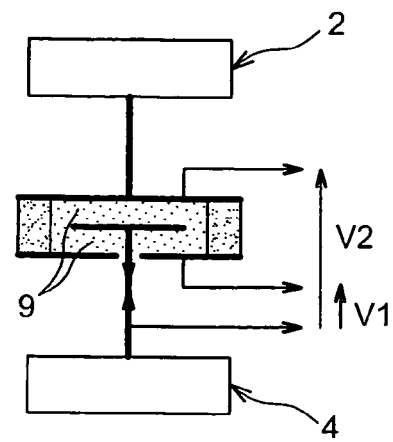
FIG. 3A  FIG. 3B
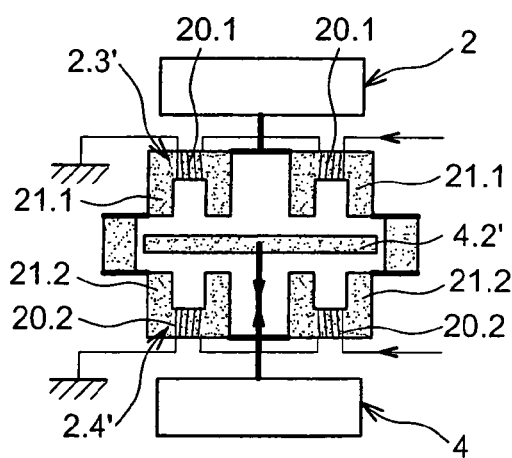
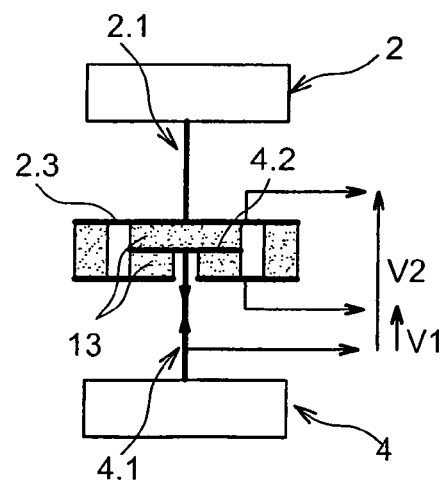
FIG. 3C  FIG. 3D

SYSTEM LIMITING THE TRANSMISSION OF MECHANICAL VIBRATIONS BY FREQUENCY FILTERING

CROSS-REFERENCE TO RELATED PATENT APPLICATION OR PRIORITY CLAIM

This application claims the benefit of a French Patent Application No. 07-52801, filed on Jan. 22, 2007, the disclosure of which is incorporated herein in its entirety by reference.

TECHNICAL FIELD AND PRIOR ART

This invention relates to a device capable of limiting the transmission of mechanical vibrations between a first element and a second element, in particular between a support placed on the ground and a device supported by the former.

Vibrations present in the environment, for example from a high accuracy appliance, for example a tool or a measuring device, can disturb the operation of this appliance. For example, the passage of a person close to the ground on which the appliance is placed may be enough to falsify the operation which it is in the process of performing.

The transmission of seismic disturbances to a civil works structure, for example to the piles of a bridge, can endanger the latter.

These problems of acoustic noise emitted by sources of mechanical vibration are broadly familiar. The solution generally proposed hitherto consists of countering the source of vibration.

Hitherto, two types of solution were provided.

The first type of solution consists of applying directly a force opposed to this vibration. However, this type of solution is limited by the dimensions and the energy consumed. Indeed, to dampen a vibrating part it is necessary to set in motion a moving part whose mass is not negligible in relation to the mass of the system to dampen and be capable of applying to it acceleration forces at the same level as the forces which are applied to the vibrating part.

The second type of solution is to counter the acoustic noise by emitting an acoustic wave in antiphase to the acoustic noise to be attenuated. However, this is only really effective in a limited space.

Consequently, one aim of this invention is to offer an effective system capable of limiting the effects of external vibrations on an object placed on the field of the source(s) of vibration in a limited space.

DESCRIPTION OF THE INVENTION

The aim previously described is achieved by a system forming a physical link between both parts, allowing transmission of movements and vibrations in a given frequency band by transmission of forces in this frequency band, for example at low frequency, and limiting the transmission of vibrations or movements in another given frequency band by preventing transmission of forces in this other frequency band, for example at high frequencies (i.e. for example vibrations which generate an acoustic noise distressing for the user).

In other words, a link is made in which the stiffness of the force can vary according to the frequency. Thus, if the link is more flexible, this prevents the transmission of the vibratory source to the environment in question, whereas, if the link is stiff, the vibrations of the mobile part are transmitted to the other part.

According to this invention, the transmission of vibrations is prevented rather than attempting to absorb mechanical vibrations or acoustic noise as in the state of the art.

According to this invention, it works by transmitting force and not by transmitting movement and it is therefore possible to manage vibrations of a complex type, i.e. in which the signal includes a low frequency part and a high frequency part. The forces transmitted are only those in the desired frequency range, according to the aim to be achieved.

This invention thus plans to reduce the transmission of vibrations from one part to another by implementing positional control over a given frequency band. Instead of applying forces which impose a relative position for all frequencies, forces are applied only over the given frequency band to provide a given positioning in this frequency band, and relative movements in another frequency band are unaffected.

The means employed to assure this relative positioning in order to transmit these forces are for example of the electromagnetic, electrostatic, piezoelectric, electric, magnetostrictive, etc., in which the voltage or current is controlled based on the desired frequencies for transmission.

The frequency band, in which the force is transmitted, is defined by means of a frequency filter, which receives as input signal the measurement of a distance between the parts in question, and delivers as output signal the measurement of the distance in the given frequency band.

The principal objective of this invention is thus a linkage system between a first and a second part, capable of being moved relative to each other, including a link capable of transmitting forces between the first and second parts and a loop for controlling the frequency of said link including means of measuring a distance separating the first and second parts, a frequency filter for said measurements in a given frequency band and means for comparing these filtered values with a set point, said control loop controlling the link, in order that it transmits forces only in the given frequency band.

In one advantageous embodiment, the filter is a low pass filter, thus only forces at low frequencies are transmitted from the second part to the first part.

The cut-off frequency of the low pass filter can thus be a few Hertz, in order that vibrations from surrounding machines (around 50 Hz) and resonant vibrations to the support (some tens of Hertz for buildings) are not transmitted to the machine tool.

The filter can advantageously be sized such that, with the loop open, the overall phase lag of the system is maintained at around −135° around the cut-off frequency of the filter with the loop closed, in order to obtain a stable system without using a corrector.

The system according to this invention, provided with a low pass filter, can also include a second control loop provided with means to measure an acceleration of the first part and a high pass filter to filter said acceleration, said filtered acceleration being transmitted to the comparator to be used to control said link. This enables elimination or at least reduction of the high frequency "internal" vibrations of the first part.

In one particularly advantageous embodiment of the system according to the invention, the frequency control loop is a position control loop, the system also including a speed control loop integrated with the position control loop, and a force control loop integrated with the speed control loop.

The speed control loop can therefore include a frequency filter and a comparator of a speed set point and a relative speed of the first and second parts, said speed set point emanating from the position control loop, and the force control loop including a frequency filter and a comparator of a force set point and a force applied between the first and second parts, said force set point emanating from the speed control loop.

In an advantageous manner, the force control loop includes means for determining the force applied between the first and second parts, said means estimating the force applied by means of the relative position of the first and second parts and a link control parameter. It is thus possible to happen on a specific force sensor.

The link can be of the electromagnetic, electrostatic, piezoelectric, electric or magnetostrictive type.

The link can be designed to transmit a force in both directions of movement of the first and second parts.

In the case of an electrostatic link, this can include a flexible polymer dielectric allowing an increase in the electric field between the first and second parts.

In one embodiment, the imposed set point is constant.

The objective of this invention is also an assembly of a first and a second part, the first part being fixed, the second part being mobile relative to the first part, mechanical means being provided to move the second part relative to the first part, and including a link system according to this invention, in which the filter is a high pass filter and in which a null set point is imposed.

The objective of this invention is also an appliance including a device and a support, incorporating at least one and advantageously four link systems according to this invention, in order to suspend said device at the support. Each link system can be connected to the support and to the device by ball joints.

The objective of this invention is also a method of controlling a contactless link in a first and a second part, including the steps:
 of measuring the distance between the two parts,
 of filtering the values thus measured,
 of comparing these filtered values with a set point,
 of controlling the forces in said link based on the comparison.

The filtering step is advantageously carried out by a low pass filter.

The method of control can also include steps:
 of measuring an acceleration of the first part,
 of filtering these measurements by means of a high pass filter, and
 of controlling the forces in the link based on these filtered values.

The objective of this invention is also a method of controlling a contactless link between a first and a second part, including:
 determining the force applied between the first and second parts,
 filtering in frequency of the applied force,
 comparison between the filtered value and the value of the set point force,
 controlling the force of said link according to the result of the comparison,
 determining the relative speed between the first and second parts,
 filtering the relative speed determined,
 comparison between the filtered relative speed and the value of the set point force,
 adjusting the set point force,
 determining the relative position between the first and second parts,
 comparison of the filtered relative position with the value of the set point position,
 adjusting the set point speed.

Determination of the force applied can be obtained advantageously by estimating the latter from the relative distance between the first and second parts and at least one link control parameter.

BRIEF DESCRIPTION OF THE DRAWINGS

This invention will be best understood from the description which follows and the attached drawings, on which.

DETAILED DESCRIPTION OF PARTICULAR EMBODIMENTS

Figure 1:
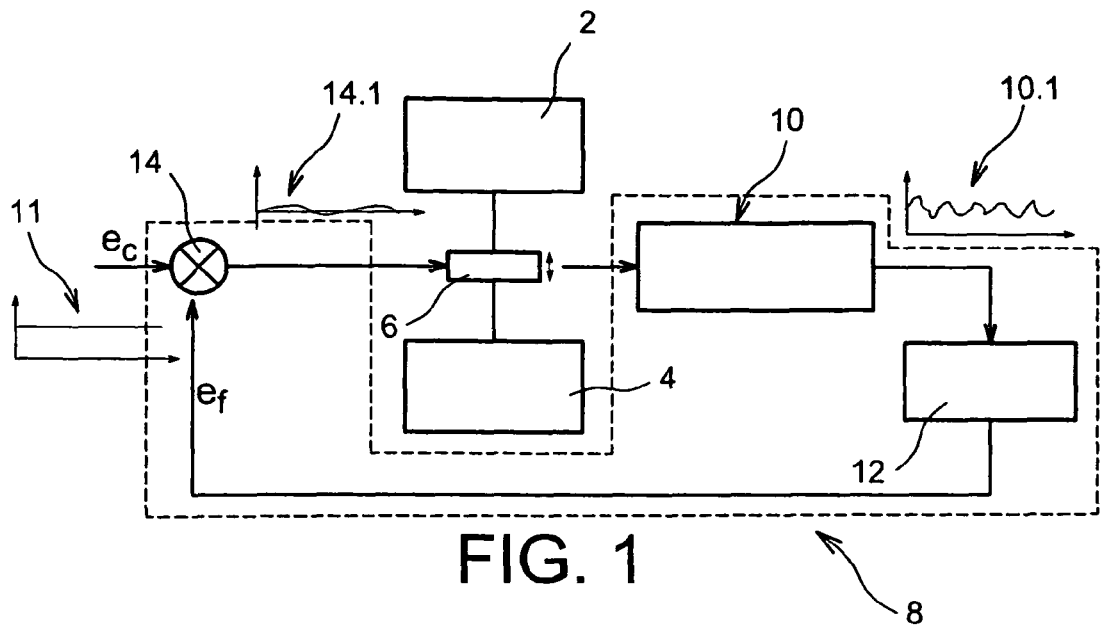
FIG. 1 is an example of a block diagram of a linkage system according to the invention using a low pass filter.

The linkage system according to this invention, of which one embodiment is depicted in block diagram form in FIG. 1, is tended to link physically a first part 2 and a second part 4 in force in a given frequency range.

The first part 2 and the second part 4 are capable of moving relative to each other as shown by the arrows 3.

The linkage system according to this invention includes a physical link 6, of variable stiffness in frequency, and means 8 of controlling said stiffness in frequency.

The physical link 6 supports the first part 2 and the second part 4 without contact and can be obtained by means of electromagnetic, electrostatic, piezoelectric, electric, magnetostrictive actuators, or by any other means allowing a transmission of force without contact.

In the description which follows, actuator will refer to means forming part of the link and capable of applying a force between the first and second parts.

Different examples of actuators will be described in detail hereafter, related to FIGS. 3A to 3D.

The link 6 (visible in FIG. 3A) includes a first element 2.1 integral in movement with the first part 2 and a second element 4.1 integral in movement with the second part 4. During a relative movement of the part 4 relative to the part 1, the distance e or air gap separating the element 2.1 and the element 4.1 varies, this being on the basis of the variation of this distance e and the stiffness in frequency of the link 6 is changed.

The means 8 of control include means to implement a control in frequency of the relative position of the part 2 and of the part 4. To achieve this, the means 8 of control include means 10 to measure the distance e or more precisely the variation of the distance e with time, shown in block diagram form by the diagram 10.1. The means 10 can include sensors of the relative position between the elements 2 and 4 positioned between the two elements.

These sensors can be, for example, of the optical, capacitive or inductive type.

The distance can be measured directly by the actuator itself, by measuring either the capacitance if it is an actuator of the capacitive type, or the reluctance if it is an actuator of the magnetic type.

The means of control also include a filter 12 in frequency to filter the variation of the air gap e and to keep the variation of the air gap e only in the frequency band set by the filter.

The filter 12 can be of the low pass, high pass or band pass type according to the application, as will be seen in what follows.

The means of control 8 also include a comparator 14.1 intended to receive first a set point value of the air gap ec and the value of the filtered air gap, referred to as ef.

The comparator 14 calculates a difference 14.1 or error between the set point ec and the filtered air gap value ef, this difference then being used to control the link 6 in order to cancel it.

In the example represented in FIG. 1, the air gap set point e is constant (shown in diagram form in the graphic 11) and the filter 12 used is a filter of the low pass type. In the output from the filter 12, the air gap variation signal is thus a low frequency signal.

The comparator then supplies a low frequency error and the means of control the actuators in low frequencies in order to cancel this error. To achieve this, only the low frequency forces from the part 4 are transmitted to the part 2.

Consequently, at low frequencies the air gap e is maintained appreciably constant, whereas at high frequencies this distance varies freely and the movement of the part 4 is free relative to that of the part 2.

This is shown in diagram form by the graphics 15, 17 of the movements with time of the part 2 and of the part 4 respectively.

Moreover, at high frequencies, vibrations are generally of lower amplitude and thus the actuator can act only over a very short travel, typically of a few tens of microns. The link 6 can thus advantageously be very compact and have a low consumption, even if the forces to be transmitted are large.

Indeed, in the case of a link of the electrostatic or electromagnetic type, the capacitance or the reluctance respectively, and thus the efficiency in terms of force and consumption, is appreciably greater and the air gap e, which is equivalent to the possible travel of the elements 2.4.1 of the parts 2 and 4 respectively, is small.

Figure 2:
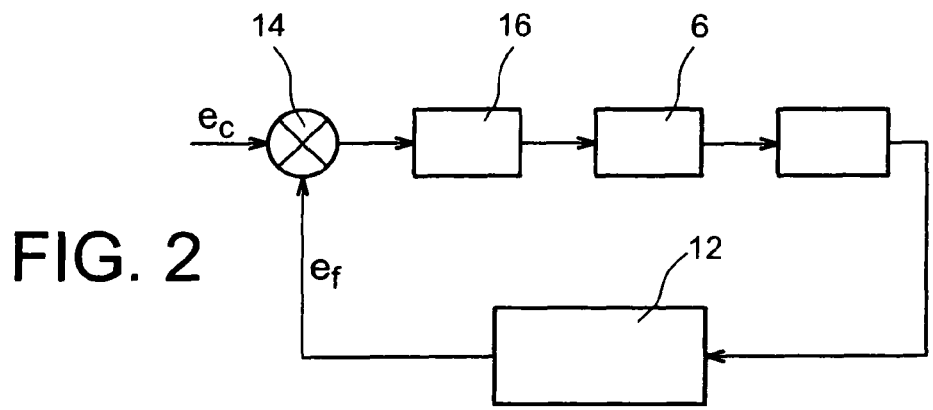
FIG. 2 is a block diagram of the linkage system from FIG. 1, FIGS. 3A to 3D are schematic views of four variations embodying the link.

In FIG. 2, a block diagram of the linkage system from FIG. 1 can be seen, in which a corrector 16 has been added between a comparator 14 and the link 6, the corrector enabling the stability of the system to be ensured.

It is also possible to plan advantageously a filter dimensioned such that the system is stable, which can avoid the use of a corrector, called hereafter a filter of the improved type.

In general a system is stable in closed loop if the open loop phase for a gain $\geq$ to 0 dB does not fall as far as $-180°$. Generally, a margin of 45° is taken, as it is considered that up to $-135°$, the system will be sufficiently stable in closed loop.

The filter is then dimensioned such that the overall phase shift of the system in open loop is held at approximately $-135°$ around the desired cut-off frequency in closed loop, for example by adding phase lead or lag circuits. It is advantageous to extend over a few decades imposition of the phase around $-135°$, which can maximise the decrease of the gain with frequency not only at the desired cut-off frequency, but also beyond in order that the very low frequency gain can be very high in order to ensure a very good counter-response by the control and vice versa, best minimise the counter-response effect at very high frequency.

The system incorporating such a filter follows in closed loop the set point up to approximately the desired cut-off frequency, then above this no longer responds to set point signals. A stiff link is then established between the set point and the low frequency output and a very flexible high frequency link is established.

It is also possible to prepare a template for estimating the force applied from a measurement of the relative position and of the control parameters of the actuator, termed reverse force template, which can offer a system of controlling force without a force sensor and thus reducing the cost price of the system.

Figure 11:
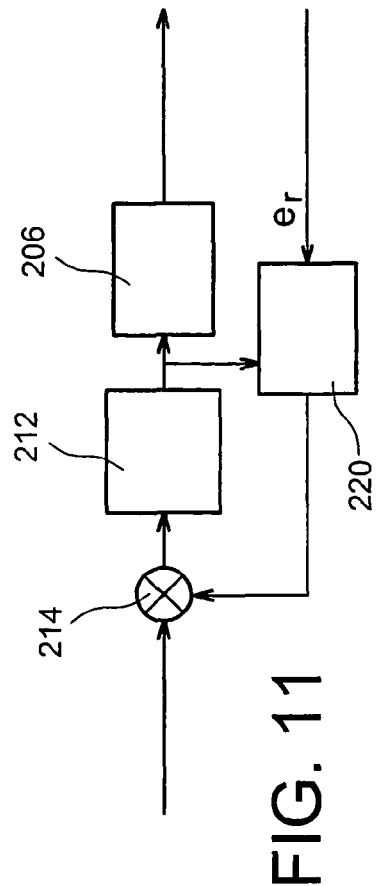
FIG. 11 is a block diagram of a system according to the invention without a force sensor.

Such a system can be seen in FIG. 11. This includes a set point force as input, a low pass filter 212 dimensioned as described previously, an actuator 206, a comparator 214 and a reverse force template 220.

In the circuit of FIG. 11, the reverse force template receives as input the relative position between the first part 2 and the second part 4 and the control parameters of the actuator, for example in the case of a piezoelectric actuator, a control parameter is voltage and in the case of an electromagnetic actuator the control parameter is current.

This template receives as input the relative position of the two elements of the link.

The template can then estimate the force applied by the actuator.

It is this estimated value which is forwarded to the comparator 214 and compared with the set point value.

Figure 9:
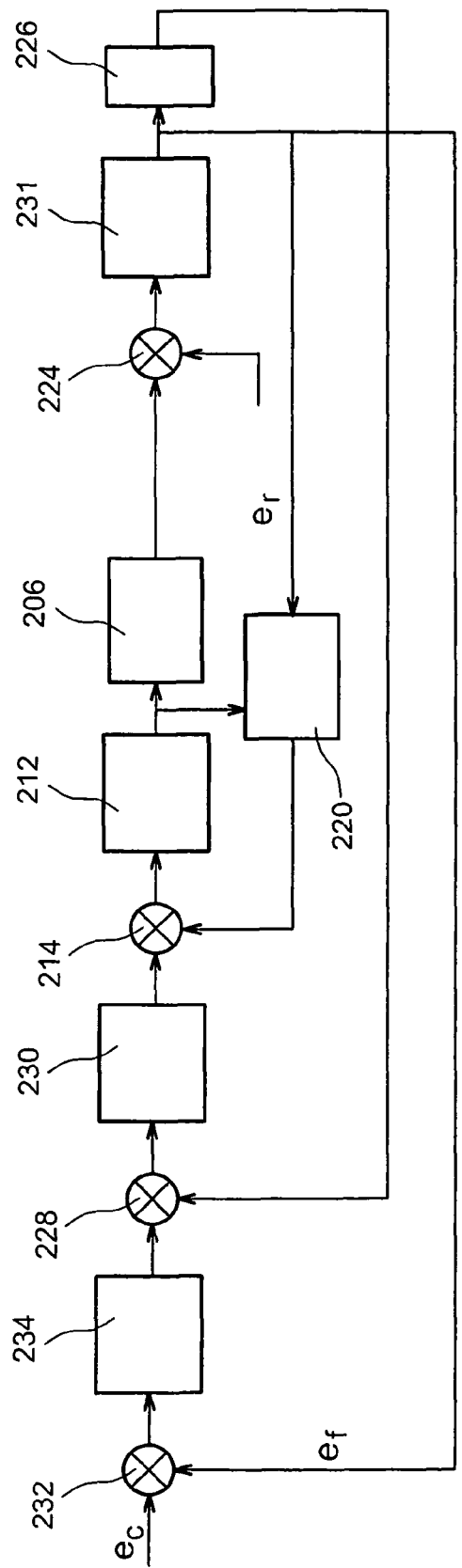
FIG. 9 is a block diagram of a first example of a system according to the invention with three levels of integration.

The stability of the system according to the invention can be improved further by adding several levels of integration as represented in FIG. 9.

Indeed, in one system according to the invention, the parameter to be controlled corresponds to several levels of integration of the parameter which can be affected, for example the position relative to a force generator (actuator), which acts directly on the acceleration; it is then particularly advantageous to produce a system with several loops.

If the system includes a mobile mass, the operation of the actuator can be modelled in part by a double integration; it is then advantageous to produce a system with two loops corresponding to two integration levels.

In the case of a system according to this invention, the latter works in force, which corresponds to working in acceleration according to the following relationship:

$$F = Ma$$

F being the force,
M being the mass of the moving part,
a being the acceleration.

The parameter which can be affected is accordingly acceleration. However, the parameter which we want to control is the relative position of the two moving parts relative to each other or the air gap.

As the air gap is the double integral of acceleration, two control loops are provided accordingly.

Thus, to control the relative position of the two parts 2 and 4, i.e. implement positional control, by force control exercised between the two parts, an intermediate speed control step is used.

This avoids the risks of instability which may arise during a double integration in the case of controlling the relative position directly from the force.

The system according to the invention then includes three control loops B1, B2, B3.

A first loop provides force control, a second loop provides speed control and a third loop provides relative position control.

The first loop B1, which controls the force, is integrated with the second loop B2 to control the relative speed, itself integrated with the third loop B3 to control relative position (FIG. 9).

The third loop B3 corresponds to the loop from FIG. 2, inside which first loop B1 and the second loop B2 have been incorporated.

The third loop B3 includes a low pass filter 234 of the improved type, in which the output is connected to the input for the loop B2, an actuator 206, means 231 for measuring the relative position of the parts 2 and 4 and, in the example depicted, these means include two sensors for measuring the position of the parts 2 and 4 and a comparator 224, and a comparator 232 receiving as input the air gap set point and the relative position of the parts 2 and 4.

The second loop B2 includes a comparator 228 which receives the output from the comparator 232 from the loop B3 and the actual relative speed, a low pass filter 230 of the improved type, in which the output is connected to the first loop B1, and the means 226 of determining the relative speed of the two parts 2 and 4. This can be, for example, sensors or means of calculating the first derivative of the relative position.

The first loop B1 includes a comparator 214 receiving as input the output from the improved low pass filter 230 in the loop B2, a low pass force filter 212 of the improved type connected to the actuator 206 and in the example depicted the reverse template 220 of the force in FIG. 9 to determine the applied force.

A conventional force sensor could of course be used to determine the applied force.

Figure 10:
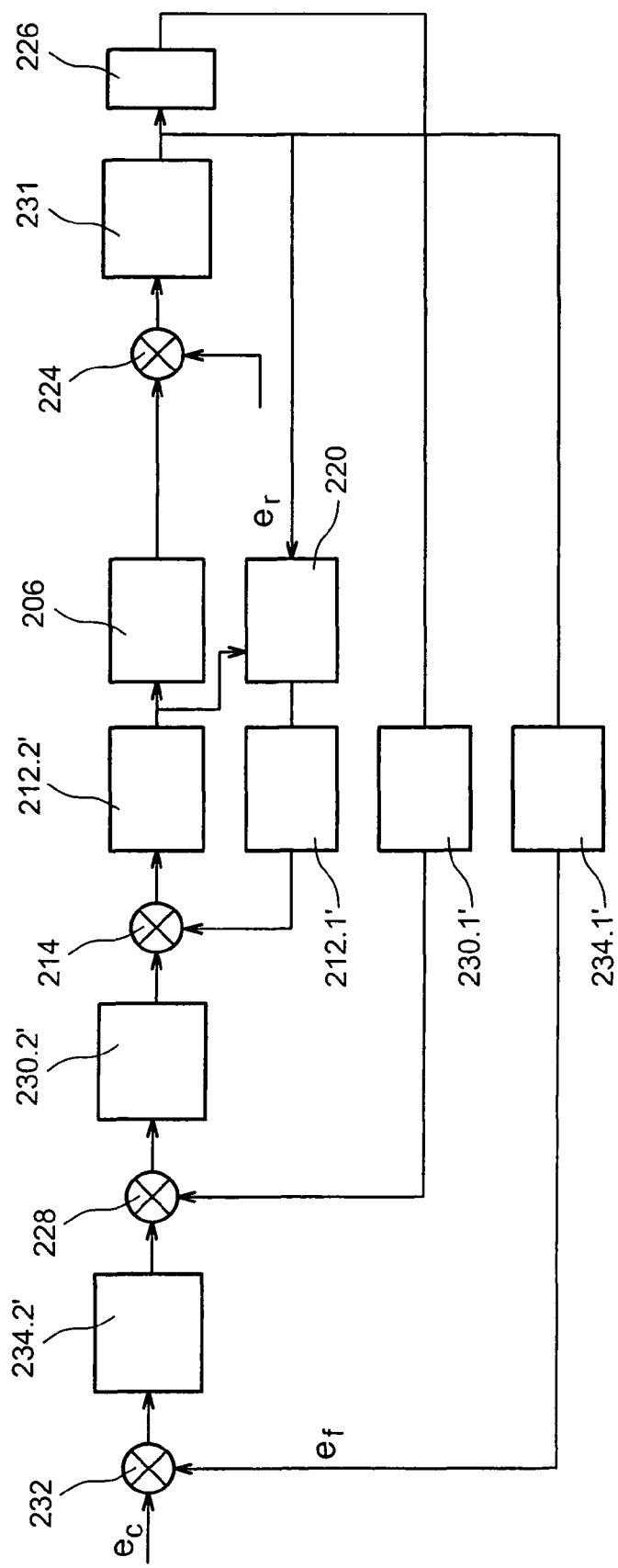
FIG. 10 is a block diagram of a second example of a system according to the invention with three levels of integration.

In FIG. 10 can be seen another example of a system in which the filters used are not of the improved type but are of the simple type associated with a corrector.

The loop B1 includes a low pass filter 212.1' and a force corrector 212.2'.

The loop B2 includes a low pass filter 230.1' and a speed corrector 230.2'.

The loop B3 includes a low pass filter 234.1' and a position corrector 234.2'.

The operation of the system in FIG. 10 will now be explained.

The applied force is determined first, for example by direct measurement or by estimation by means of a reverse force template.

The force is then filtered in frequency by the filter 212.1', and a comparison is made between the filtered value and the force set point value.

A force control is then implemented according to the result of the comparison.

A determination of the relative speed of the two parts 2 and 4 then follows, either by direct measurement or by derivation of the relative position of the two parts 2 and 4.

The relative speed is filtered by the filter 230.1'. The result is then compared with the set point speed value.

There is then an adjustment of the force set point, which is applied to the comparator 214.

A determination of the relative position of the two parts, filtering by the filter 234.1' and a comparison with the position set point value follows.

There is then an adjustment of the speed set point at the input to the comparator 228 as a consequence.

In cases of complex systems, for example incorporating a moving part which can be modelled by a number of masses connected by springs, the system can become a third order system, in this case the system includes more than two integration levels.

In the working diagram in FIG. 2, the comparator is provided after the filter 12, but the filter 12 could also be installed after the comparator 14. Indeed, if the set point ec is constant, the filtering of the signal from measuring the air gap sampled from a constant signal gives a single output signal.

FIGS. 3A to 3D are schematic views of different types of actuator that can be used in the linkage system according to this invention.

FIG. 3A is a link including an actuator of the electrostatic type.

The element 2.1 of the part 2 includes, for example, a housing delineated according to the direction of motion of the part 4 relative to the part 2 by parallel first and second walls 2.3 and 2.4. The element 4.1 of the part 4 includes a conducting plate 4.2 floating between the wall 2.3 and the wall 2.4; application of a voltage V2 between the plate 4.2 and the wall 2.3 causes the part 2 and the part 4 to move together and application of a voltage V1 between the plate 4.2 and the wall 2.4 causes the part 4 and the part 2 to move apart.

The voltages V1 and V2 are managed in frequency in the given frequency band in which a force is to be transmitted, i.e. in the band of the filter 12, so as to support the part 1 and the part 2 in a median position.

In FIG. 3B can be seen a variation of the implementation of an actuator of the electrostatic type, in which a flexible polymer dielectric 9 is inserted between the walls 2.3, 2.4 and the mobile plate 4.2.

This implementation has the advantage of being achievable with higher electric field values relative to the implementation of FIG. 3A and thus capable of transmitting higher forces.

In FIG. 3C can be seen a contactless link provided with an actuator of the electromagnetic type.

The actuator includes a housing delineated in the direction of separating/closing together of the parts 2 and 4, by the approximatively parallel walls 2.3', 2.4', with which the part 2 is integral in movement, and between which a plate 4.2' with magnetic properties can move. The wall 2.3' includes two primary windings 20.1 assembled around two primary cores 21.1 and the wall 2.4' includes two second windings 20.2 placed around two second cores 21.2.

The windings 20.1, 20.2 and the cores 21.1, 21.2 are arranged in pairs, so as to be capable of applying two magnetic fields such that the forces applied to the mobile plate 4.2' are in opposite directions.

Thus, by causing a current to pass in one or the other of the pairs of windings, the parts 2, 4 can be moved together or apart.

In FIG. 3D can be seen a link of the type with piezoelectric actuation.

The linkage has appreciably the same structure as that represented in FIGS. 3A and 3C, but a piezoelectric material 13 is placed between the plate 4.2 of the element 4.1 and the wall 2.3 and the wall 2.4. Thus, by controlling the voltages V1 and V2 as described previously, according to the orientation of the piezoelectric polarisation it is possible to move the parts 2 and 4 together or apart.

Thus, with this invention and the use of a low pass filter, it is possible to eliminate forces transmitted at high frequencies, for example it is possible to eliminate completely the acoustic noise transmitted from one part to the other or damaging vibrations in the device implementing the linkage system according to this invention.

Furthermore, this linkage system can have very high flexibility at high frequencies and very precise positioning at low frequencies, whatever the static forces to be transmitted, unlike a simple flexible link of the rubber bushing or bearing type to the state of the art, which offers only a single frequency in the entire frequency range in question.

Moreover, as was said earlier, this invention allows actuation over a short travel and at low frequencies, which means transmitting large forces with reduced dimensions and very low consumption.

Finally, with this invention, it is possible to measure forces transmitted from one part to the other by a single measurement of current or voltage applied to the link in combination with position measurement: this link thus forms an undeformable force sensor.

Indeed, as was explained earlier, given the control characteristics of the actuator, the force exerted by one part on the other can be deduced. Second, the system is controlled and any distortion caused by this force is compensated immediately, unlike a piezoelectric or piezoresistive sensor.

Figure 4:
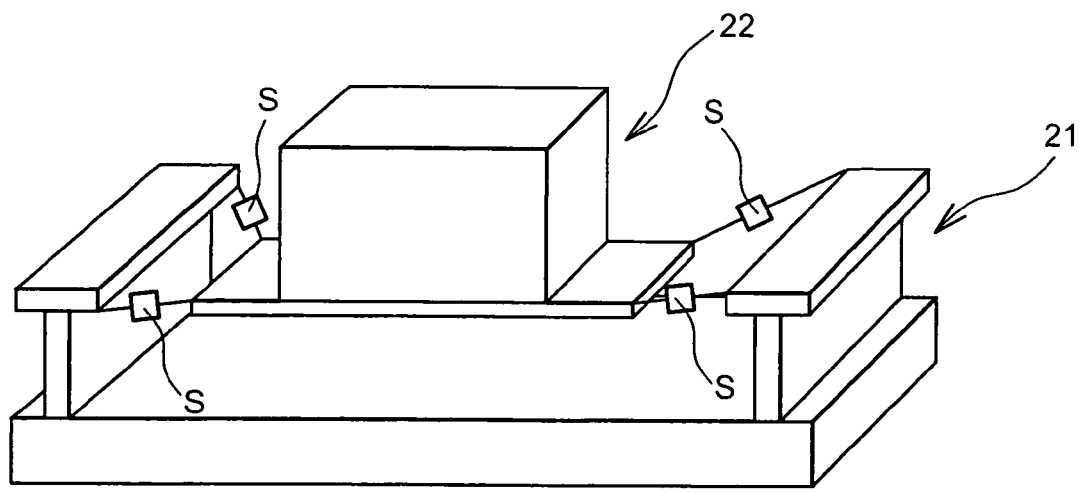
FIG. 4 is a schematic view of an embodiment of the linkage system according to this invention for a machine tool.

In FIG. 4 can be seen an embodiment of a machine tool using four linkage systems according to this invention. The machine tool incorporates a support 21 and a machine tool 22 itself, the machine tool 22 being suspended on the support 21 by means of four systems S of linking according to this invention fixed, in the example depicted, to the four corners of a base 24 of the machine tool 22 and to the support 21.

Each link of each of the systems S of linking is thus controlled independently, in the manner described previously in relation with FIGS. 1 and 2.

In the case of a precision machine tool, a reduction of the transmission of vibrations, which the support 21 may experience, to the machine tool 22 is sought, while at the same time guaranteeing precise positioning of the latter relative to the support 21.

With this invention, it is possible to hold the machine tool in a median position relative to the support, even if the mass of the machine experiences variations or if the centre of gravity changes from one use to another, by adjusting the voltages V1 and V2, in the case of an electrostatic actuator, or the currents in the case of an electromagnetic actuator.

Furthermore, with this invention, it is possible to guarantee the level of the machine tool and virtually to isolate the machine tool from movements which the support may experience, for example those caused by the passage of a person close to the spot where the machine tool is placed.

In the case of the machine tool, the linkage systems, and in particular the actuators, are not necessarily bidirectional, in fact the weight of the machine tool, which is divided over the four linkages, tends to extend the elements of the machine tool participating in the linking of the elements of the support participating in the linkage. It suffices therefore to stipulate that it be possible to exercise a force to bring these elements together. Unidirectional actuators are therefore sufficient.

The stiffness obtained, for example at low frequencies in the example depicted, is ensured according to the invention by the control loop obtained by the means of control 10.

At high frequencies, still in the example depicted, the linkage systems become flexible and thus avoid transmitting the forces originating from them, for example vibrations of the support. Direct action on the forces transmitted by the support 21 to the machine tool 22 and not to the relative position of the support 21 relative to the machine tool, and more generally from part 2 relative to part 1, can control the transmission of forces from one part to the other, particularly according to their frequency.

The attachment of the four linkage systems to the machine tool 22 and to the support 21 can be effected advantageously with ball jointed means of linking, thus the linkage systems are stressed only along their longitudinal axis.

Figure 5:
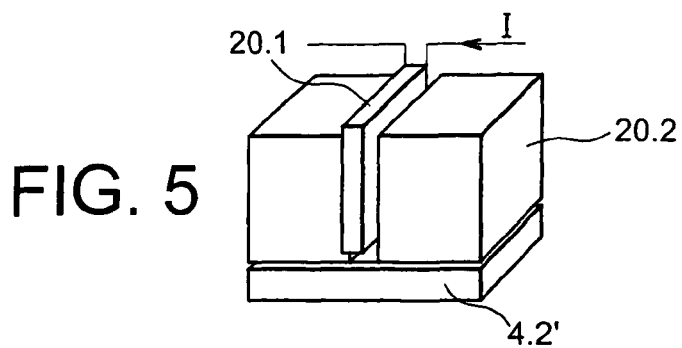
FIG. 5 is another depiction of a link using an electrostatic actuator.

In FIG. 5 can be seen a practical embodiment of actuators of the electromagnetic type for a linkage system of the electromagnetic type. At variance with those means depicted in FIG. 3C, those in FIG. 5 include only a single winding 20.1.

For example, a load of 100 kg to be distributed between four linkage systems according to this invention is considered. Assuming that the mass is not distributed in a uniform manner, it can be assumed that each system must support at most a load of 50 kg, i.e. 500N. Actuators according to this invention, in which the volume is approximately 34 $cm^3$ are then inadequate.

Figure 6:
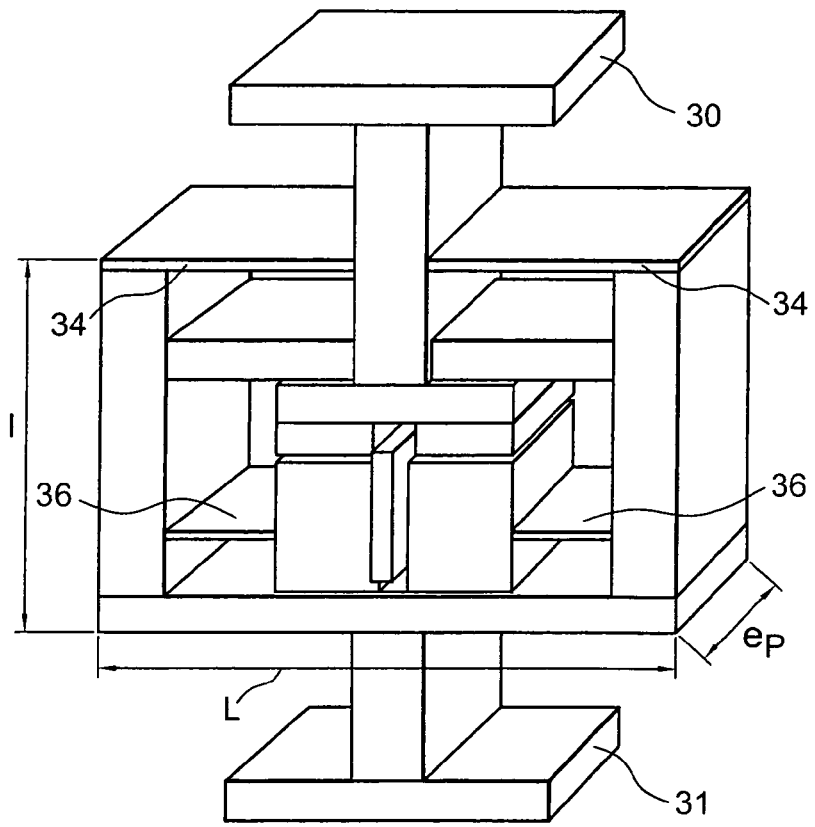
FIG. 6 is an isometric view of an embodiment of a link for the system according to this invention.

In FIG. 6 can be seen a practical embodiment of a linkage system according to this invention, capable of being used in the machine tool represented in FIG. 4, and using the actuators from FIG. 5.

This linkage system is of the unidirectional type, and can only exert a force bringing the two moving parts together.

This linkage system includes an element 30 for attachment to the support 21 and an element 31 for attachment to the machine tool 22.

The actuators are interposed between the two attachment elements 30, 31.

Means of guidance 34, 36 are provided to guide the relative movement of the two attachment elements, for example formed by flexible metal beams. Indeed, the amplitude of movement being approximately 100 μm, the elasticity of a metal or metallic alloy is sufficient.

Advantageously, mechanical means for axial stopping are provided, in order to limit the relative movement of the attachment elements 30, 31, for example in case of interruption of the control loop or cutting off of the electricity supply. The two attachment elements then come into mechanical contact.

For example, the following dimensions can be given for the linkage system in FIG. 6 under the conditions given in relation with FIG. 5: the system has a width L of 6 cm, a length l of 7 cm and a thickness ep of 3 cm, which represents a volume of some 126 $cm^3$.

This bulk is close to that of the bushings used conventionally for this type of application, but at the same time offering improved efficiency in eliminating vibrations. Of course, very good static positioning is achieved, as large variations of position are avoided if the load varies, and very good flexibility at high frequencies, owing to the intrinsic stiffness of the guidance system which can be several orders of magnitude below that of the bushings.

Figure 7:
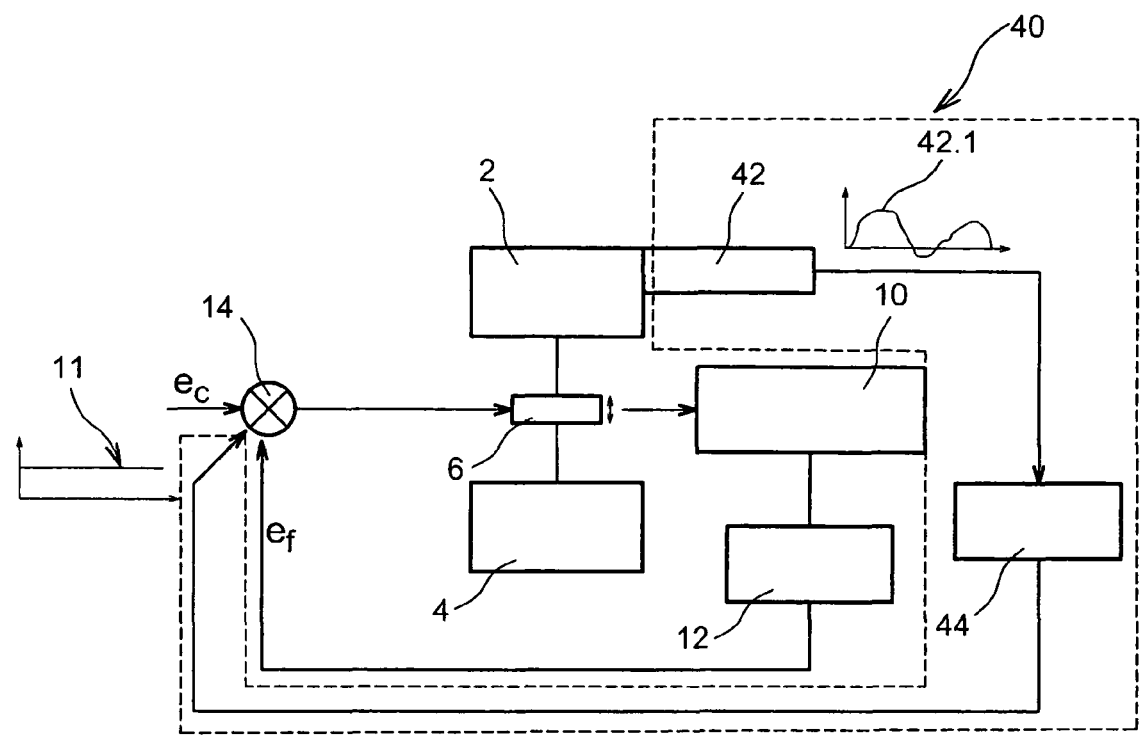
FIG. 7 is a schematic view of one version of an embodiment of a linkage system according to the invention.

In FIG. 7 can be seen a variation of an embodiment of the linkage system according to this invention, capable of preventing both the transmission of vibrations from part 4 to part 2, and vibrations created within part 2.

To achieve this, a second control loop 40, including means 42 to measure the acceleration of the part 2, depicted diagrammatically by the graphic 42.1 and a high pass filter 44 for the acceleration signal is added.

The output signal from the high pass filter is then forwarded to the comparator 14. This high pass signal is subtracted from the set point so that the actuator behaves so as to oppose these high frequency vibrations from one of the two parts absolutely and not relatively.

The part 4 then accompanies the movement of the part 2 at low frequencies, which allows precise positioning, and the high frequency accelerations of part 2 are cancelled by applying forces to the part 4, in order to cancel the balance of the forces which are applied to the part 2 at high frequencies.

The part 4 is therefore used as an intermediary to act on the part 2, in order to counter vibrations appearing in the part 2.

For example, the cut-off frequency of the low pass filter 12 can thus be some few Hertz, in order that vibrations from surrounding machines (around 50 Hz) and resonant vibrations to the support (some tens of Hertz for buildings) are not transmitted to the machine tool.

As for the high pass filter 44, the cut-off frequency can be some tens of Hertz, slightly higher than that of the low pass filter 12, so that the action cancelling the acceleration of the high frequencies from the part 2 does not interfere with the action supporting at low frequencies the relative position of the parts 2 and 4.

Furthermore, as has already been written previously, it can be advantageous to add a corrector in the control loop(s) in order to ensure stability of the system.

Figure 8:
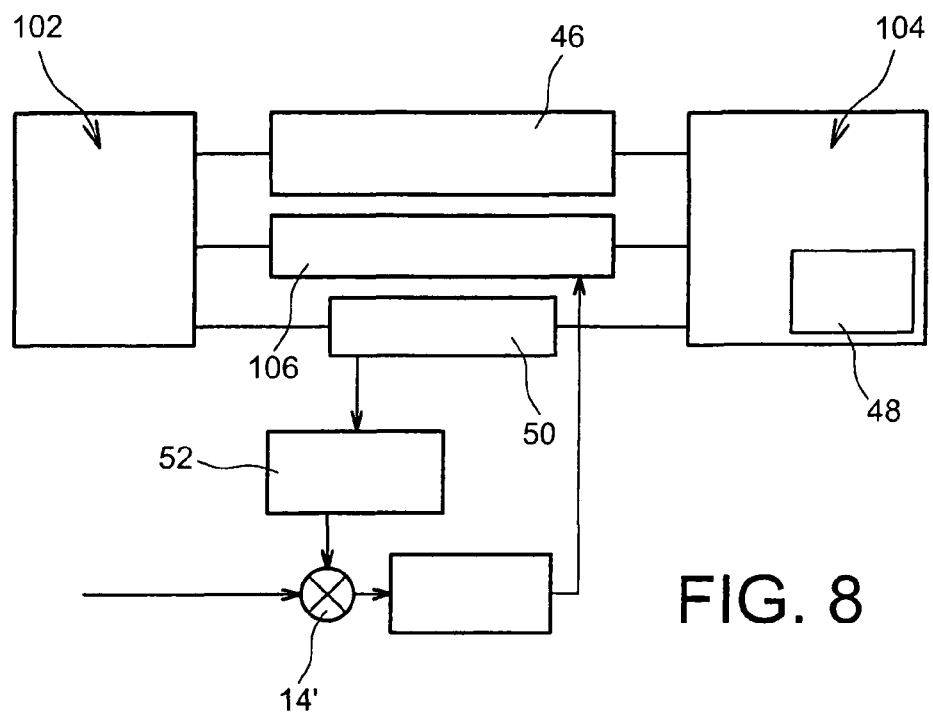
FIG. 8 is a schematic view of a linkage system according to the invention using a high pass filter.

In FIG. 8 can be seen an embodiment of an assembly of two parts, one of which is fixed and the other mobile, using a linkage system according to this invention, in which it is desirable to prevent any sudden movement or any vibration (high frequencies) of a moving part relative to a fixed part.

The linkage system is placed between a first fixed part 102 and a second part 104 movable relative to the first fixed part 102 by a movement system 46, normally low frequency, and includes a physical linkage 106, but which, owing to its technology also causes vibrations at higher frequencies. Furthermore, the moving part 104 also includes an intrinsic mechanical vibration source 48.

To eliminate high frequency vibrations of the moving part 104, this invention provides for the use in the feedback loop of a high pass filter 52. On this occasion, this is a linkage that is very flexible at low frequencies and stiff at high frequencies.

The system also includes a sensor 50 of the relative position of the part 102 and the part 104. This measurement is sent into the high pass filter 52, then the output signal is fed into the comparator 14' on which is imposed a null set point.

The output signal from the comparator is then forwarded to the linkage system, in particular the actuators.

The first part 102 forms a reference element.

In this example, a null high frequency relative movement is imposed and low frequency relative movements are left completely free.

The system then generates only high frequency forces, in order to limit undesirable vibrations in the moving part and transmits hardly any low frequency forces which could disturb the movement system. The first part being fixed, it has no high frequency vibrations and the second moving part 4 has no high frequency movements.

Similarly, it is possible to consider, for example, limiting the vibrations of a control element of the control lever type or a steering wheel by placing a linkage stiff at high frequencies and flexible at low frequencies between the control element and the passenger compartment. The vibrations normally transmitted to the control element via the mechanical linkage which connects it to the system to be controlled are thus blocked by the linkage according to the invention placed between the control element and the control support (passenger compartment) with which the user is connected mechanically.

This invention applies particularly for replacing bushings or bearings used in industry, in anti-seismic systems for civil works, for example in bridge piles, in force measurement systems, because the invention allows precise measurement and the systems cannot be deformed statically.

This invention applies also to anti-noise systems for submarines (for piping attachments, machines, inside of the hull, etc.) and to systems for limiting relative movements at high frequencies.

The invention claimed is:

1. Linkage system between a first part and a second part capable of movement relative to each other, incorporating a link capable of transmitting forces between the first and second parts and a frequency control loop for said link incorporating means of measuring a distance separating the first and second parts, a frequency filter for said measurements, said frequency filter letting through the values of said measures in a given frequency band and means for comparing these filtered values with a set point, said control loop controlling the link such that it transmits forces only in the given frequency band, in which the frequency control loop is a position control loop, and in which a speed control loop is incorporated in the position control loop, and a force control loop is incorporated in the speed control loop.

2. System according to claim 1, in which the speed control loop includes a frequency filter and a comparator of a speed set point and a relative speed of the first and second parts, said speed set point emanating from the position control loop, and in which the force control loop includes a frequency filter and a comparator of a force set point and a force applied between the first and second parts, said force set point emanating from the speed control loop.

3. System according to the preceding claim, in which the force control loop includes means for determining the force applied between the first and second parts, said means estimating the force applied by means of the relative position of the first and second parts and a link control parameter.

4. Linkage system according to claim 1, in which the link is of the electromagnetic, electrostatic, piezoelectric or magnetostrictive type.

5. Linkage system according to claim 4, in which the electrostatic linkage includes a flexible polymer dielectric allowing an increase of the electric field between the first and second parts.

6. System according to claim 1, in which the link can apply a force in both directions of motion of the first and second parts.

7. System according to claim 1, in which the set point is constant.

8. System according to claim 1, in which the filter is a low pass filter, and only low frequency forces are transmitted from the second part to the first part.

9. System according to the preceding claim, in which the cut-off frequency of the low pass filter is a few Hertz, say 50 Hz.

10. System according to claim 8, including a second control loop provided with means of measuring an acceleration of the first part and a high pass filter to filter said acceleration, said filtered acceleration being transmitted to the comparator to be used to control said link.

11. System according to claim 1, in which the filter is dimensioned such that in open loop the overall phase shift of the system is maintained at about −135° around the cut-off frequency of the filter in closed loop.

12. Assembly of a first part and a second part, the first part being fixed, the second part being movable relative to the first part, mechanical means being provided to move the second part relative to the first part, and including a linkage system between the first part and the second part, the linkage system incorporating a link capable of transmitting forces between the first and second parts and a frequency control loop for said link incorporating means of measuring a distance separating the first and second parts, a frequency filter for said measurements, said frequency filter letting through the values of said measures in a given frequency band and means for comparing these filtered values with a set point, said control loop controlling the link such that it transmits forces only in the given frequency band, in which the frequency control loop is a position control loop, and in which a speed control loop is incorporated in the position control loop, and a force control loop is incorporated in the speed control loop, and in which the speed control loop includes a low pass filter and the force control loop includes a low pass filter.

13. Appliance including a device, a support, and at least one linkage system, advantageously four, between a the device and the support, the linkage system incorporating a link capable of transmitting forces between the first and second parts and a frequency control loop for said link incorporating means of measuring a distance separating the first and second parts, a frequency filter for said measurements, said frequency filter letting through the values of said measures in a given frequency band and means for comparing these filtered values with a set point, said control loop controlling the link such that it transmits forces only in the given frequency band, in which the frequency control loop is a position control loop, and in which a speed control loop is incorporated in the position control loop, and a force control loop is incorporated in the speed control loop, in order to suspend said device at the support.

14. Appliance according to claim 13, in which each linkage system is connected to the support and to the device by ball joint linkages.

15. Method for controlling a contactless linkage between a first part and a second part, including:
   determining the force applied between the first and second parts,
   filtering in frequency of the applied force,
   comparison between the filtered value and the value of the set point force,
   controlling the force of said link according to the result of the comparison,
   determining the relative speed between the first and second parts,
   filtering the relative speed determined,
   comparison between the filtered relative speed and the value of the set point force,
   adjusting the set point force,
   determining the relative position between the first and second parts,
   comparison of the filtered relative position with the value of the set point position,
   adjusting the set point speed.

16. Method according to the preceding claim, in which the determination of the force applied is obtained by estimating the latter from the relative distance between the first and second parts and at least one link control parameter.

* * * * *